(12) United States Patent
Bent et al.

(10) Patent No.: US 11,748,308 B2
(45) Date of Patent: Sep. 5, 2023

(54) HYBRID DEDUPLICATION IN STORAGE SYSTEMS

(71) Applicant: Seagate Technology LLC, Fremont, CA (US)

(72) Inventors: John Michael Bent, Los Alamos, NM (US); Mohamad El-Batal, Superior, CO (US); Sai Narasimhamurthy, Haywards Heath (GB)

(73) Assignee: Seagate Technology LLC, Fremont, CA (US)

( * ) Notice: Subject to any disclaimer, the term of this patent is extended or adjusted under 35 U.S.C. 154(b) by 4 days.

(21) Appl. No.: 17/667,706

(22) Filed: Feb. 9, 2022

(65) Prior Publication Data
US 2023/0252001 A1 Aug. 10, 2023

(51) Int. Cl.
*G06F 16/17* (2019.01)
*G06F 16/174* (2019.01)
*G06F 16/14* (2019.01)

(52) U.S. Cl.
CPC ........ *G06F 16/1752* (2019.01); *G06F 16/152* (2019.01)

(58) Field of Classification Search
CPC .................................................. G06F 16/1572
See application file for complete search history.

(56) References Cited

U.S. PATENT DOCUMENTS

| 8,364,652 | B2* | 1/2013 | Vijayan .............. G06F 16/9014 707/694 |
| 8,577,851 | B2 | 11/2013 | Vijayan et al. |
| 9,477,677 | B1 | 10/2016 | Wang et al. |
| 9,753,648 | B2 | 9/2017 | Rao et al. |
| 9,898,225 | B2 | 2/2018 | Vijayan et al. |
| 10,452,617 | B2 | 10/2019 | Therrien et al. |
| 2014/0095439 | A1 | 4/2014 | Ram |
| 2015/0127621 | A1 | 5/2015 | Kuo |
| 2020/0081868 | A1 | 3/2020 | Lin et al. |

OTHER PUBLICATIONS

Singhal S., et al., "A Survey on Data Deduplication", International Journal on Recent and Innovation Trends in Computing and Communication, vol. 5, No. 5, pp. 1045-1052, May 2017.

* cited by examiner

*Primary Examiner* — Baoquoc N To
(74) *Attorney, Agent, or Firm* — Westman, Champlin & Koehler, P.A.

(57) ABSTRACT

A method includes receiving a piece of data for storage in a storage system, breaking the piece of data into a plurality of fixed size data portions, and determining a deduplication hash for each of the fixed size data portions. The method further includes checking for matching hashes already stored in the storage system, storing fixed size data portions unmatched to an already stored hash with metadata identifying the unmatched hash fixed size data portions in the storage system, and storing metadata for hash fixed size data portions already stored in the data storage system. The piece of data is reviewed for further deduplication using sliding window hashes during background activity of the data storage system.

18 Claims, 3 Drawing Sheets

HYBRID DEDUPLICATION IN STORAGE SYSTEMS

SUMMARY

In one embodiment, a method includes receiving a piece of data for storage in a storage system, breaking the piece of data into a plurality of fixed size data portions, and determining a deduplication hash for each of the fixed size data portions. The method further includes checking for matching hashes already stored in the storage system, storing fixed size data portions unmatched to an already stored hash with metadata identifying the unmatched hash fixed size data portions in the storage system, and storing metadata for hash fixed size data portions already stored in the data storage system. The piece of data is reviewed for further deduplication using sliding window hashes during background activity of the data storage system.

In another embodiment, a method includes receiving a piece of data for storage in a storage system, performing a first fixed window deduplication process on the piece of data prior to writing the piece of data to the storage system, performing a second sliding window deduplication process asynchronously on the piece of data after it is written to the storage system.

In yet another embodiment, a system includes a data storage device to receive a piece of data to be stored, and a controller. The controller is configured to receive the piece of data for storage in the storage system, perform a first fixed window deduplication process on the piece of data prior to writing the piece of data to the storage system, perform a second sliding window deduplication process asynchronously on the piece of data after it is written to the system.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure generally provide a tiered deduplication in a data storage system, with a first deduplication process performed on initial write, and a second, asynchronous deduplication process performed during background activity.

Deduplication is a technique to reduce the amount of physical storage capacity consumed as a ratio of logical data that is stored. At a basic level, multiple users may store the same piece of data, or a single user may store the same piece of data multiple times. At a physical level, it is desirable to only store the physical data once. At a logical level, metadata is stored for each instance of the piece of data. The metadata points to the physical location for each of the instances. The logical table of metadata will contain multiple pointers to the same piece of data where multiple instances are present, but only one copy of the data is physically stored. Reference counting and checking may be used to make sure that a piece of data is not deleted when one of its metadata pointers is removed. In this way, deletion of one logical copy does not delete physical data if the physical data is associated with more than one logically stored data. Like all methods of data reduction, deduplication can reduce the ratio between the number of bytes of logical data stored and the number of bytes of physical storage consumed.

Figure 1:
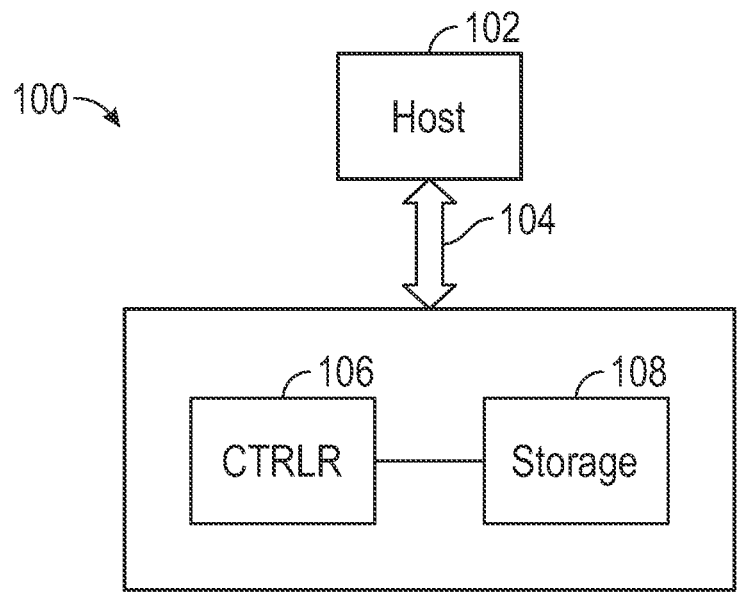
FIG. 1 is a block diagram of a representative system on which embodiments of the present disclosure may be practiced.

Prior to providing a detailed description of the different embodiments, one example of an illustrative operating environment in which certain specific embodiments disclosed herein may be incorporated is shown in FIG. 1. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same or like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a diagrammatic illustration of a system in which data deduplication is carried out in accordance with certain embodiments of the present disclosure. Specifically, FIG. 1 provides a simplified block diagram of a data storage device (DSD) 100. The DSD 100 may be coupled to a host 102 and may service commands from the host 102. The host 102 may also be referred to as the host system, host device or host computer. The host 102 can be a desktop computer, a laptop computer, a server, a tablet computer, a telephone, a music player, another electronic device, or any combination thereof. The DSD 100 can communicate with the host device 102 via a hardware or firmware-based interface 104. The interface 104 may comprise any interface that allows communication between a host 102 and a DSD 100, either wired or wireless, such as NVMe (non-volatile memory express), SCSI (small computer system interface), SAS (serial attached SCSI), FC-AL (fiber channel arbitrated loop), PCI-E (peripheral component interconnect express), IDE (integrated drive electronics), AT (advanced technology), ATA (advanced technology attachment), SATA (serial advanced technology attachment), eSATA (external SATA), PATA (parallel ATA), PCIe (peripheral component interconnect express), IEEE (institute of electrical and electronics engineers)-1394, USB (universal serial bus), compact flash, Ethernet, Thunderbolt, or other interface connector adapted for connection to a host computer. The interface 104 may include a connector (not shown) that allows the DSD 100 to be physically removed from the host 102.

DSD 100 can include a programmable controller 106 and main storage 108. Programmable controller 106 can include associated memory and one or more processors. The main storage 108 can be arranged as one or more non-volatile memory elements such as solid-state memory arrays or rotatable recording discs to provide a main data storage space.

In general, to implement deduplication, a block of data is identified by a signature which is typically generated via a hash, fingerprint, checksum, or the like, of the data. The signature of a new block of data is generated and compared with the set of signatures currently stored. If there is match, then the new block need not be actually physically stored. Instead, the system metadata is updated to increase the reference count for the single copy of the physical data actually stored.

Deduplication does not necessarily reduce the number of stored copies of a piece of data to one, for various potential reasons. For example, there might actually be more than one copy if the system is doing replication. However, even in this instance, the amount of physical data stored is bounded by the number of replicas and not by the number of times a logical piece of data is stored. For example, assume a 3-way replicated system into which the same image is stored one million times. In a non-deduplicated system, this image will actually be stored three million times. In a deduplicated system, this image will only be stored 3 times. It should be understood that deduplication systems typically also at some point do a full verify of the data to protect against hash collisions.

Embodiments of the disclosure relate to a two-tiered deduplication scheme for storage systems. Upon receipt of a piece of data to be written, the data is broken into fixed windows, for example, individual megabytes (MB) of data, at locations 0-1 MB, 1-2 MB, . . . . A signature or other mathematical function is determined for each fixed window, and the signature is compared to stored signatures for blocks already stored in the system. If a match is found, metadata only is stored for that block pointing to the existing physical location in the storage system. This initial fixed window look at the data will catch a substantial portion of potential deduplication, but not all.

A second deduplication process using sliding windows is then carried out, at a later time, after the data has been stored. This includes, for example, instead of checking only 0-1 MB, 1-2 MB, . . . , checking each MB of the data in sliding form. For example, 1-1 MB+1, 2-1 MB+2, 3-1 MB+3, . . . . This process is much more expensive in terms of operating costs. For one gigabyte (GB) of data in 1 MB fixed windows, there would be 1024 calculations. For 1 GB of data in 1 MB sliding windows, one billion calculations would be used. The embodiments of the disclosure carry out this second deduplication process asynchronously, for example during background system operations like data scrubbing. This further improves deduplication without incurring write latency for excessive operations during writes.

In one embodiment, breaking the piece of data into a plurality of fixed size portions comprises breaking the piece of data into one MB portions. It should be understood that the size of the portions may be altered without departing from the scope of the disclosure. Deduplication using fixed windows in one embodiment also uses the one MB windows in fixed locations of the file, such as the first MB, the second MB (e.g., byte to byte 1024 [1 MB], and 1 MB offsets from that).

When a signature of a fixed size portion of the piece of data matches a signature of a stored fixed sized portion of data, then logical metadata is stored that points to the physical location of the stored fixed size portion of data. In this way, the physical data that is already present is not stored again. Instead, a logical pointer to the physical data is stored. When the hash of the fixed size portion is unmatched in already stored data, as determined by no matching hash being found, the physical data is stored to the storage system, along with logical metadata pointing to the physical data. Computed hashes may be stored in the metadata, or in separate locations. The metadata may be stored in the data storage system, or another dedicated storage, without departing from the scope of the disclosure.

The further deduplication using sliding windows is performed in one embodiment during background activity such as by reviewing during refresh scrubbing of data. Reviewing the piece of data during background activity further comprises examining a sliding portion of the piece of data to further increase deduplication. Determining a deduplication hash comprises calculating a unique signature for each of the fixed size data portions in one embodiment.

An example of a deduplication process according to embodiments of the present disclosure is described below. Imagine a piece of data to be stored has a particular size. To identify that piece of data, an easy way is to calculate or otherwise determine a piece of math or signature (e.g., a fingerprint, checksum, hash, or the like) that identifies the piece of data as a smaller representation of the piece of data. One way of determining a signature is to do a full object signature. However, large pieces of data that may differ in their entirety may have sections within the piece of data that are the same. So, a plurality of fixed windows are used to check for deduplication, with each window having a predetermined size. The piece of data is broken into smaller chunks, and a signature is determined for each portion. This uses more metadata than a single signature for the entire piece of data, but allows for deduplication on a smaller portion size.

For example, consider a piece of data comprising a 1 GB file. One deduplication using fixed windows would break the file into a plurality of windows each having the same size. For example, 1000 1 MB windows cover the entire file. A 1 GB file is really a linear array of one billion bytes. Starting at byte 0, a fixed window deduplication obtains a signature of the first MB. Then the process moves to location offset 1

MB, to get a signature of the second MB (offset MB 1 to offset MB 2), and so on. The signatures may then be checked against signatures of pieces of data already stored in the system. Any time a window of the plurality of fixed windows matches a MB already stored in the system, as determined by signature comparison between the window being examined and signatures of the windows of data already stored, that fixed window of data is deduplicated. This is a quick method of deduplication since storage systems are already breaking data into smaller portions. Choosing a fixed window size that corresponds to an already determined block/chunk/portion size is therefore straightforward. The fixed windows are of a particular size and also at a particular location. That is, signatures are reviewed for 1 MB windows starting at 0, offset 1 MB, offset 2 MB, . . . . The window locations are fixed.

Consider now a file that is largely the same as another file. If even a single byte of information is inserted, for example, at the start of the file, then fixed window deduplication, while it is fast and is able to be performed at an initial write for storing data, will not be sufficient to catch and deduplicate such a file due to the fixed window size and location. Fixed window deduplication will catch and deduplicate a number of identical pieces or blocks of data, but when a small change is made to a larger piece of data, fixed window deduplication will not catch all duplications.

For example, in such a "modified" file, the first MB is not identical to that of an already stored file that differs only by the first byte. Therefore, no "offset" MB s are identical either. However, if the first MB is shifted, for example by the single byte that is added at the start of the file, then the first "shifted" MB will be identical to the stored first MB. This is the concept of a sliding window, and why sliding windows are useful. However, sliding windows are very processor intensive. Shifting by a single byte, and then determining a new signature for the shifted MB, allows for a comparison. In a 1 GB file, however, using a one byte shift, the number of determinations and comparisons jumps from 1024 in a fixed window deduplication to one billion in the example sliding window.

An example of a sliding window configuration is first looking at a window of byte 0 to 1 MB, then to byte 1 to 1 MB+1 byte, byte 2 to 1 MB+2 bytes, etc. At its most basic and processor intensive operation, a sliding window will catch every possible continuous MB of the new file and compare each MB to already stored data. This becomes prohibitively expensive, especially during a write operation. That many calculations would almost certainly affect latency and create performance issues on writes.

One classic use of sliding windows is in the storage of virtual machines. Virtual machines in the cloud are used to do work, and then often, are snapshotted and frozen for later work. When the user wishes to continue the work, the virtual machine is restored, and work continues. While a number of users may use virtual machines for largely different work and different applications, a large amount of virtual machine data is identical across many virtual machines. For example, multiple users may be running a Windows virtual machine, with copies of the entire operating system, Microsoft Word, PowerPoint, Excel, web browsers, and the like. Each virtual machine of a number of virtual machines will have identical full programs, but they are not necessarily in the exact same order or storage order. Therefore, standard deduplication will not catch all of those duplicate pieces of data. Sliding windows can.

The problem with sliding windows is that computing a signature for a MB of data is an expensive operation. Fixed window on a MB window for 1 GB is 1024 signatures. However, sliding windows at every byte offset is a billion determinations.

Storage systems, however, already do a large amount of background work. Such background work includes by way of example, refresh scrubbing and parity checks, to maintain data as it is intended to be. Silent data corruption is protected by erasure and replication, parity checks, refresh scrubbing, and the like. So data storage systems are constantly reading for checking and detection of silent data corruption. In one embodiment, since the data storage system is already reading all the data on it, that is a suitable time to carry out sliding window deduplication.

So, in an embodiment, since data is already being read, that is the time to carry out slower sliding window deduplication. Embodiments of the present disclosure use this time to perform further deduplication based on sliding windows. The sliding windows are used at a time when the overhead for processing sliding windows is significantly reduced. Sliding window deduplication only adds the additional processing steps of determining a hash for each MB (or other size chunk). Different fixed widow and sliding window configurations and implementations may be used without departing from the scope of the disclosure.

Figure 2:
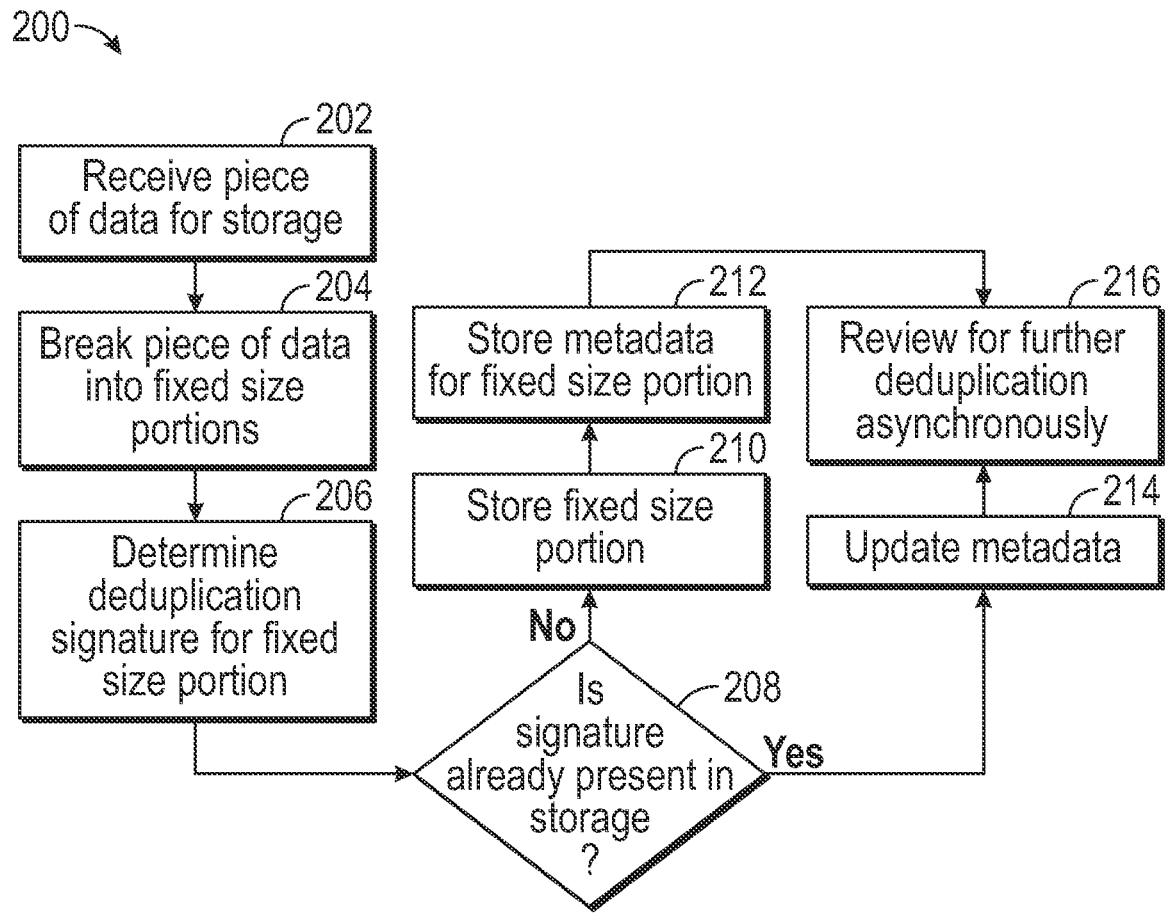
FIG. 2 is a flow chart diagram of a method according to an embodiment of the present disclosure.

A method 200 for deduplication in a data storage system is shown in flow chart form in FIG. 2. Method 200 comprises receiving a piece of data for storage in a storage system in block 202, and breaking the piece of data into a plurality of fixed size data portions in block 204. A signature is determined for each of the fixed size data portions in block 206. Method 200 further comprises checking for matching signatures already stored in the storage system in decision block 208. When the signature for the fixed size data portion is unmatched to an already stored signature, the data is stored in block 210, and metadata identifying the unmatched fixed size data portions is stored as well, in block 212. When the signature for the fixed size data portion is matched to a signature for data already stored in the data storage system, metadata for the fixed size data portion already stored in the data storage system is updated in block 214. The updating in one embodiment updates the metadata so that there is more than one logical identifier for a piece of data stored in the data storage system, with each logical pointer in the updated metadata pointing to the already stored piece of data. In block 216, data stored in the storage system is reviewed for further deduplication using sliding window signatures during background activity of the data storage system.

Further deduplication as discussed above for block 216 of method 200 using sliding window hashes is in one embodiment performed by reviewing the piece of data for further deduplication using sliding windows of a same size as the fixed size data portions. Alternatively, the piece of data may be reviewed for further deduplication using sliding windows of a different size from the fixed size data portions.

Figure 3:
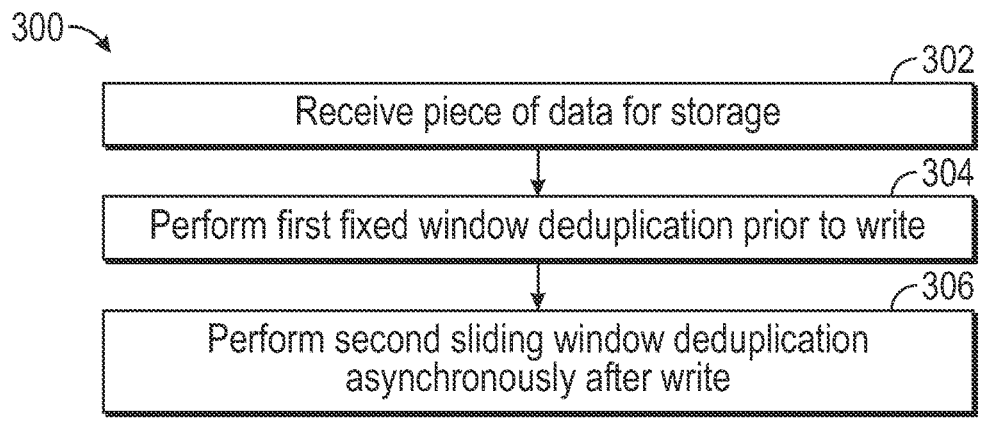
FIG. 3 is a flow chart diagram of a method according to another embodiment of the present disclosure.

A method 300 of deduplication according to another embodiment is shown in flow chart form in FIG. 3. Method 300 comprises, in one embodiment, receiving a piece of data for storage in a storage system in block 302. On that piece of data, a first fixed window deduplication process is performed prior to writing the piece of data to the storage system in block 304. A second sliding window deduplication process is performed asynchronously on data stored in the storage system in block 306 after it is written to the system. The second sliding window deduplication process is performed during background activity of the storage system in one example. The second sliding window deduplication process is performed during refresh scrubbing activity of the storage system in one example.

In one embodiment, performing the first fixed window deduplication process comprises breaking the piece of data into a plurality of fixed size windows, determining a signature for each fixed size, checking for matching signature already stored in the storage system, updating metadata information when a matching signature is found, and writing the piece of data and associated metadata to the storage system when no matching signatureis found. Performing the second sliding window deduplication process comprises performing a sliding window check of signature during a refresh scrubbing of the data storage system in one embodiment. Then, when a matching signature is found during the second sliding window deduplication process, metadata information is updated for the data of the matching signature, and the data in a current second sliding window is removed.

Figure 4:
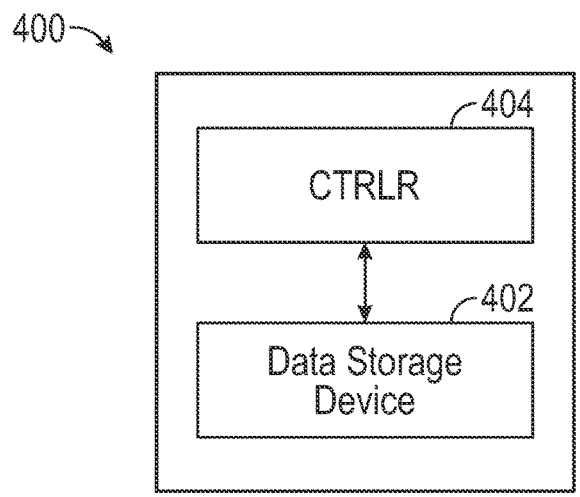
FIG. 4 is a block diagram of a system according to an embodiment of the present disclosure.

A system 400 according to another embodiment of the present disclosure is shown in FIG. 4. System 400 comprises a data storage device 402 to receive a piece of data to be stored, and a controller 404. The controller 404 is in one embodiment configured to receive the piece of data for storage in the data storage device 402, to perform a first fixed window deduplication process on the piece of data prior to writing the piece of data to the data storage device 402, and to perform a second sliding window deduplication process asynchronously on data stored in the data storage device 402 after it is written to the data storage device 402. The data storage device 402 may be a hard disk drive (HDD) system, a solid state drive (SSD) system, or a hybrid system.

As in the method of FIG. 3, performing the first fixed window deduplication process comprises breaking the piece of data into a plurality of fixed size windows, determining a signature for each fixed size window, checking for matching signatures already stored in the data storage device 402, updating metadata information when a matching signature is found, and writing the piece of data and associated metadata to the data storage device 402 when no matching signature is found. Performing the second sliding window deduplication process comprises performing a sliding window check of signatures during a refresh scrubbing of the data storage device 402 in one embodiment. Then, when a matching signature is found during the second sliding window deduplication process, metadata information is updated for the data of the matching signature, and the data in a current second sliding window is removed.

Figure 5:
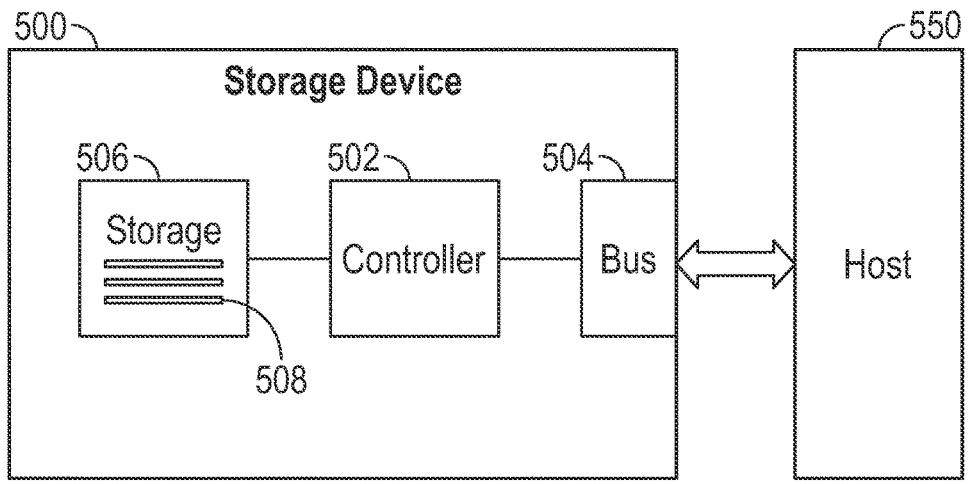
FIG. 5 is a block diagram of a data storage device on which embodiments of the present disclosure may be used.

Referring now to FIG. 5, a simplified block diagram of a storage system 500 in which embodiments of the present disclosure may be practiced is shown. Storage system 500 may be a HDD with a platter or platters 508, a read head, and associated controllers (not shown). System 500 may include, by way of example, a controller 502 couplable via a bus 504 or the like to a host system 550, where the host system 550 may provide power over the bus 504 or through a separate power bus (not shown), and a storage component 506 (such as a spinning disk or platter of disks 508). Controller 502 is configured to carry out deduplication in accordance with one or more of the methods described above. To carry out the deduplication, the controller 502 may execute instructions stored on any tangible computer-readable medium/memory in storage system 500.

Figure 6:
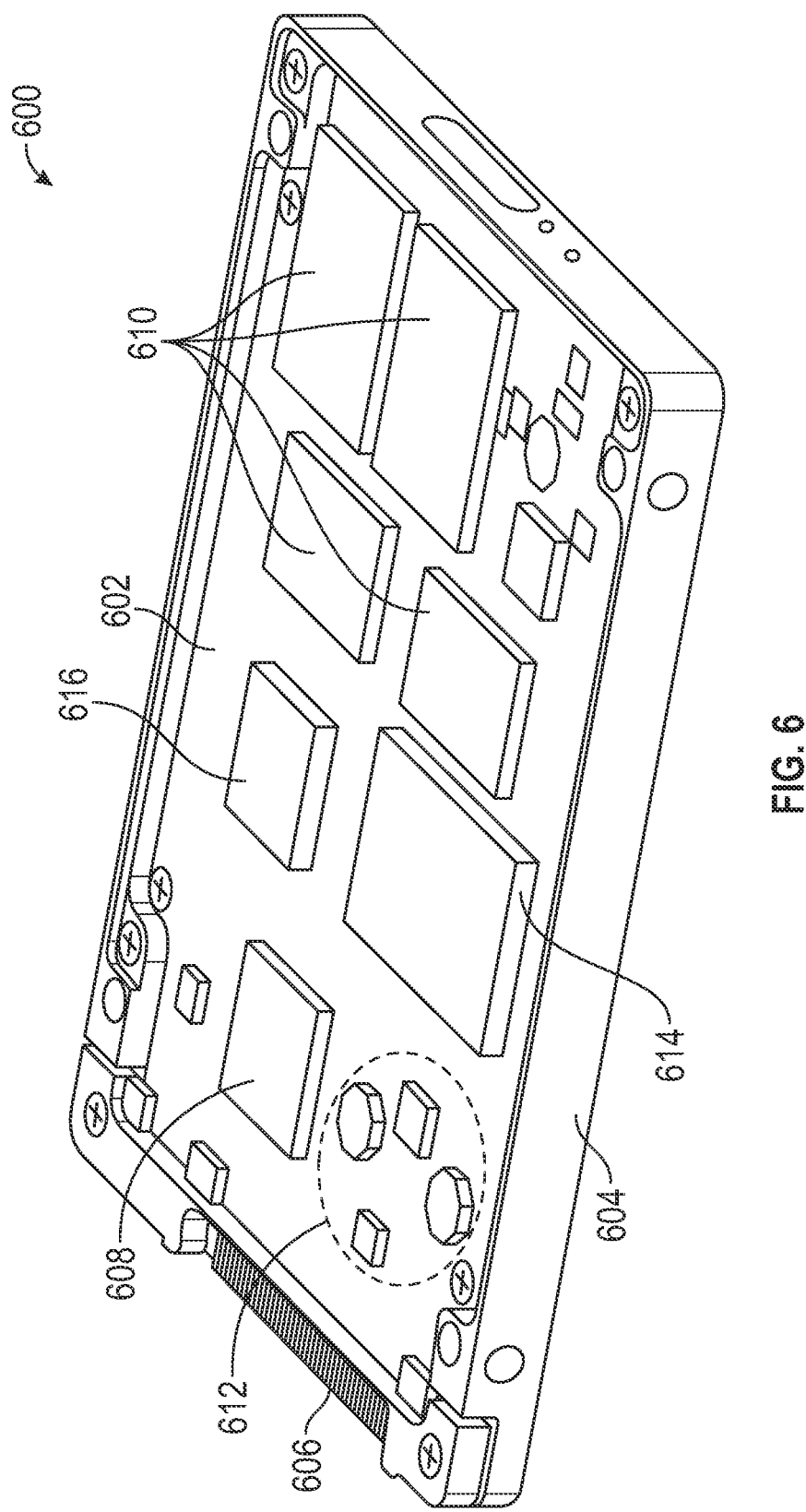
FIG. 6 is an oblique view of a solid state drive (SSD) on which embodiments of the present disclosure may be used.

FIG. 6 illustrates an oblique view of a solid state drive (SSD) 600 in which embodiments of the disclosure may be practiced. SSD 600 includes one or more printed circuit boards (PCBs) or circuit card assemblies 602 and typically includes a protective, supportive housing 604, and one or more interface connectors 606. SSD 600 further includes a controller application specific integrated circuit (ASIC) 608 or field programmable gate array (FPGA), one or more non-volatile memory devices 610, and power regulation circuitry 612. The memory devices 610 are essentially the SSD's data storage media. SSD 600 may include erasure blocks as the physical storage locations within memory device 610, which may include Flash memory devices, for example. In some applications, SSD 600 further includes a power-backup energy storage device, such as a super-capacitor 614.

In accordance with certain aspects, the SSD 600 includes the circuit card assembly 602 that includes a connector 606 for connection to a host computer (not shown). In accordance with certain aspects, the connector 606 includes NVMe (non-volatile memory express), SCSI (small computer system interface), SAS (serial attached SCSI), FC-AL (fiber channel arbitrated loop), PCI-E (peripheral component interconnect express), IDE (integrated drive electronics), AT (advanced technology), ATA (advanced technology attachment), SATA (serial advanced technology attachment), eSATA (external SATA), PATA (parallel ATA), PCIe (peripheral component interconnect express), IEEE (institute of electrical and electronics engineers)-1394, USB (universal serial bus), compact flash, Ethernet, Thunderbolt, or other interface connector adapted for connection to a host computer. Controller ASIC 608 is configured to carry out deduplication in accordance with one or more of the methods described above.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
receiving a piece of data for storage in a storage system;
breaking the piece of data into a plurality of fixed size data portions;
determining a signature for each of the fixed size data portions;
checking for matching signatures already stored in the storage system;
storing fixed size data portions unmatched to an already stored signature with metadata identifying the fixed size data portions unmatched in the storage system;
storing metadata for fixed size data portions already stored in the data storage system; and
reviewing data stored in the storage system for further deduplication using sliding window signatures during background activity of the data storage system.

2. The method of claim 1, wherein breaking the piece of data into a plurality of fixed size data portions comprises breaking the piece of data into one megabyte portions.

3. The method of claim 1, wherein reviewing data stored in the storage system for further deduplication comprises using sliding windows of a same size as the fixed size data portions.

4. The method of claim 1, wherein reviewing data stored in the storage system for further deduplication comprises using sliding windows of a different size from the fixed size data portions.

5. The method of claim 1, wherein storing metadata for fixed size data portions already stored in the data storage system comprises storing metadata pointing to existing data stored in the storage system and having a signature matching the signature of the one of the plurality of fixed size data portions.

6. The method of claim 1, wherein reviewing data stored in the storage system during background activity comprises reviewing during refresh scrubbing of the data stored in the storage system.

7. The method of claim 1, wherein reviewing data stored in the storage system during background activity further comprises examining a sliding portion of the data stored in the storage system to further increase deduplication.

8. The method of claim 1, wherein determining a signature comprises calculating one of a fingerprint, hash, or checksum for each of the fixed size data portions.

9. A method, comprising:
receiving a piece of data for storage in a storage system;
performing a first fixed window deduplication process on the piece of data prior to writing the piece of data to the storage system, comprising breaking the piece of data into a plurality of fixed size windows, determining a signature for each fixed size window, checking for matching signatures already stored in the storage system, updating metadata information when a matching signature is found, and writing the piece of data and associated metadata to the storage system when no matching signature is found; and
performing a second sliding window deduplication process asynchronously on data stored in the storage system after it is written to the storage system.

10. The method of claim 9, wherein the second sliding window deduplication process is performed during background activity of the storage system.

11. The method of claim 9, wherein the second sliding window deduplication process is performed during refresh scrubbing activity of the storage system.

12. The method of claim 9, wherein performing the second sliding window deduplication process comprises performing a sliding window check of signatures during a refresh scrubbing of the storage system.

13. The method of claim 12, and further comprising, when a matching signature is found during the second sliding window deduplication process, updating metadata information for the data of the matching signature, and removing the data in a current second sliding window.

14. A system, comprising:
a data storage device to receive a piece of data to be stored; and
a controller configured to:
receive the piece of data for storage in the data storage device;
perform a first fixed window deduplication process on the piece of data prior to writing the piece of data to the data storage device, comprising breaking the piece of data into a plurality of fixed size windows, determining a signature for each fixed size window, checking for matching signatures already stored in the data storage device, updating metadata information when a matching signature is found, and writing the piece of data and associated metadata when no matching signature is found; and
perform a second sliding window deduplication process asynchronously on data stored in the data storage device after it is written to the data storage device.

15. The system of claim 14, wherein the second sliding window deduplication process is performed during background activity of the data storage device.

16. The system of claim 14, wherein the second sliding window deduplication process is performed during refresh scrubbing activity of the data storage device.

17. The system of claim 14, wherein performing the second sliding window deduplication process comprises performing a sliding window check of signatures during a refresh scrubbing of the data storage device.

18. The system of claim 17, and further comprising, when a matching signature is found during the second sliding window deduplication process, updating metadata information for the data of the matching signature, and removing the data in a current second sliding window.

* * * * *